(12) United States Patent
Yamazaki et al.

(10) Patent No.: US 11,905,175 B2
(45) Date of Patent: Feb. 20, 2024

(54) NEGATIVE THERMAL EXPANSION MATERIAL AND PRODUCTION METHOD THEREOF

(71) Applicant: JX Nippon Mining & Metals Corporation, Tokyo (JP)

(72) Inventors: Yoshiki Yamazaki, Ibaraki (JP); Kei Muneyasu, Ibaraki (JP); Makoto Mikami, Ibaraki (JP)

(73) Assignee: JX METALS CORPORATION, Tokyo (JP)

( * ) Notice: Subject to any disclaimer, the term of this patent is extended or adjusted under 35 U.S.C. 154(b) by 817 days.

(21) Appl. No.: 17/040,114

(22) PCT Filed: Jan. 28, 2020

(86) PCT No.: PCT/JP2020/002938
§ 371 (c)(1),
(2) Date: Sep. 22, 2020

(87) PCT Pub. No.: WO2020/158721
PCT Pub. Date: Aug. 6, 2020

(65) Prior Publication Data
US 2021/0024360 A1 Jan. 28, 2021

(30) Foreign Application Priority Data
Jan. 29, 2019 (JP) ................. 2019-012673

(51) Int. Cl.
*C01B 33/32* (2006.01)
*C01B 33/24* (2006.01)

(52) U.S. Cl.
CPC .............. *C01B 33/32* (2013.01); *C01B 33/24* (2013.01); *C01P 2006/32* (2013.01); *C01P 2006/90* (2013.01)

(58) Field of Classification Search
CPC ..... C01B 33/32; C01B 33/24; C01P 2006/32; C01P 2006/90; C01P 2006/10; C01P 2002/74; C01P 2002/72; C01P 2002/61; C04B 35/6262; C04B 35/22; C04B 35/16; Y02E 60/10
See application file for complete search history.

(56) References Cited

U.S. PATENT DOCUMENTS

2018/0201539 A1\* 7/2018 Thieme ................... C03C 3/068

FOREIGN PATENT DOCUMENTS

| JP | H10-095662 A | 4/1998 |
| JP | 2018-199599 A | 12/2018 |

OTHER PUBLICATIONS

Kerstan et al. Materials Research Bulletin 2011, 46, 2456-2463 (Year: 2011).\*
Thieme et al. Inorg. Chem.2016, 55, 4476-4484 (Year: 2016).\*
Vladislavova et al. Solid State Sciences 2018, 78, 107-115 (Year: 2018).\*
Extended European Search Report issued in EP Patent Application No. 20749591.2 dated Oct. 26, 2021.
Christian Thieme et al., "New Family of Materials with Negative Coefficients of Thermal Expansion: The Effect of MgO, CoO, MnO, NiO, or CuO on the Phase Stability and Thermal Expansion of Solid Solution Phases Derived from BaZn(2)Si(2)O(7)", Inorganic Chemistry, vol. 55, No. 9, pp. 4476-4484, Apr. 2016.
Christian Thieme et al., "Ba(1-x)Sr(x)Zn(2)Si(2)O(7)—A New Family of Materials with Negative and very High Thermal Expansion", Scientific Reports, vol. 5, Article No. 18040, Dec. 2015.
M. Kerstan et al., "Thermal Expansion of Ba2ZnSi2O7, BaZnSiO4 and the Solid Solutioin Series BaZn2-xMgxSi2O7 (0<=x<=2) studied by High-Temperature X-ray Diffraction and Dilatometry", Journal of Solid State Chemistry, vol. 188, pp. 84-94, Feb. 2012.
Office Action dated Nov. 29, 2022 issued in corresponding Chinese Patent Application No. 202080002709.9.

\* cited by examiner

*Primary Examiner* — Samir Shah
*Assistant Examiner* — Jordan W Taylor
(74) *Attorney, Agent, or Firm* — Howson & Howson LLP

(57) ABSTRACT

A negative thermal expansion material, being formed from $M_xSr_yBa_zZn_2Si_2O_7$ (wherein M is one or more types of Na and Ca, and x+y+z=1, 0<x≤0.5, 0.3<z<1.0), and an XRD peak intensity $I_{NTE}$ and a background intensity $I_{BG}$ of a primary phase of an orthorhombic crystal structure which exhibits negative expansion characteristics satisfy a relation of $I_{NTE}/I_{BG}>15$. An object of the present invention is to provide a negative thermal expansion material having a low specific gravity, and a negative thermal expansion material having a low Ba content.

9 Claims, No Drawings

NEGATIVE THERMAL EXPANSION MATERIAL AND PRODUCTION METHOD THEREOF

BACKGROUND

The present invention relates to a negative thermal expansion material and a production method thereof, and in particular relates to a negative thermal expansion material formed from $M_xSr_yBa_zZn_2Si_2O_7$ (wherein M is one or more types of Na and Ca) and a production method thereof.

In order to resolve the problems caused by a difference in the coefficients of thermal expansion between different materials, research and development of negative thermal expansion materials to be added for complementing such difference while maintaining the original characteristics are being conducted. As a negative thermal expansion material, known is zirconium tungstate ($ZrW_2O_8$), and research is being broadly conducted as it exhibits negative thermal expansion characteristics in a broad temperature range (−272° C. to 777° C.). Nevertheless, since the material cost of $ZrW_2O_8$ is high, there was a problem in that it could not be used casually.

As another negative thermal expansion material, Patent Document 1 discloses a material system formed from $Ba_{1-x}Sr_xZn_2Si_2O_7$. The coefficient of negative thermal expansion of this material system is −5 to −10 (ppm/K), which is a coefficient of thermal expansion that is not low even when compared to a conventionally known negative thermal expansion material, and the material cost is lower than that of $ZrW_2O_8$. Nevertheless, the industrial application thereof has not been reported to date and, moreover, there has been no report on details related to its phase diagram or crystal system of the end composition.

CITATION LIST

Patent Documents

[Patent Document 1] Specification of U.S. Patent Application Publication No. 2018/0201539

SUMMARY

As a result of advancing research regarding the material system formed from $Ba_{1-x}Sr_xZn_2Si_2O_7$, while the end composition of the compound exhibits a crystal phase (monoclinic crystal) having a coefficient of positive thermal expansion at room temperature, it is now known that it generates a phase transition at a certain temperature, and exhibits negative thermal expansion characteristics at a high temperature phase (orthorhombic crystal). Furthermore, it could be said that the foregoing material is a practical material capable of exhibiting a high temperature phase of the end composition near room temperature by substituting the alkali earth metal site of the end composition compound with a different type of alkali metal or alkali earth metal (Sr→Ba, Ba→Sr).

Nevertheless, since the foregoing material includes a heavy metal alkali earth metal element, there is a problem in that the specific gravity tends to increase, and the material tends to become sedimented when compositing a negative thermal expansion material (adding it to a material). Moreover, this crystal system contains a Ba oxide as a contained element and, since a material containing a Ba oxide needs to be indicated as a toxic substance, users will be concerned in using such material. Thus, an oxide material in which the Ba content is reduced as much as possible is being demanded.

The present invention was devised in view of the foregoing problems, and an object of this invention is to provide a negative thermal expansion material having a low specific gravity, and a negative thermal expansion material having a low Ba content.

As a result of intense study to resolve the foregoing problems, the present inventors discovered that it is possible to obtain a crystal phase (orthorhombic crystal) having negative thermal expansion characteristics even when the site of the alkali earth metal of $Ba_{1-x}Sr_xZn_2Si_2O_7$ is replaced with Ca or/and Na having a small ionic radius, and attained the present invention. In other words, the subject matter of the present invention is as follows.

1) A negative thermal expansion material, being formed from $M_xSr_yBa_zZn_2Si_2O_7$ (wherein M is one or more types of Na and Ca, and x+y+z=1, 0<x≤0.5, 0.3<z<1.0), and an XRD peak intensity $I_{NTE}$ and a background intensity $I_{BG}$ of a primary phase of an orthorhombic crystal structure which exhibits negative expansion characteristics satisfy a relation of $I_{NTE}/I_{BG}>15$.

2) The negative thermal expansion material according to 1) above, wherein a coefficient of thermal expansion of the negative thermal expansion material is −5 ppm/K or less.

3) The negative thermal expansion material according to 1) or 2) above, wherein a specific gravity of the negative thermal expansion material is less than 4.2.

4) The negative thermal expansion material according to any one of 1) to 3) above, wherein a median diameter D50 of the negative thermal expansion material is 5 μm or more and 90 μm or less.

5) A method of producing the negative thermal expansion material according to any one of 1) to 4) above, wherein a $BaCO_3$ powder, a $SrCO_3$ powder, a $CaCO_3$ powder, $Na_2CO_3$, a $ZnO_2$ powder, and a $SiO_2$ powder are mixed, and the mixed powder is calcined at 1050 to 1250° C.

According to the present invention, it is possible to provide a negative thermal expansion material having a low specific gravity, and a negative thermal expansion material having a low Ba content. It is thereby possible to alleviate the problem where the material tends to become sedimented when compositing a negative thermal expansion material. Moreover, the result will be a material that is easy to handle due to the reduction of the Ba content designated as a toxic substance. Furthermore, it is possible to reduce the material cost in comparison to zirconium tungstate ($ZrW_2O_8$) as a conventionally known negative thermal expansion material.

DETAILED DESCRIPTION

The negative thermal expansion material according to an embodiment of the present invention is characterized in being formed from $M_xSr_yBa_zZn_2Si_2O_7$ (wherein M is one or more types of Na and Ca, and x+y+z=1, 0<x≤0.5, 0.3<z<1.0). The ionic radiuses of Na and Ca are respectively 116 and 114 μm and smaller than Ba (149 μm) and Sr (132 μm), but it is possible to obtain a crystal phase (orthorhombic crystal) having negative thermal expansion characteristics by substituting them for Ba and Sr at predetermined ratios. The specific gravity can thereby be reduced as well. Moreover, as the elements to be substituted, it is considered that the same effects can also be obtained with K (potassium) and Mg (magnesium) in addition to Ca and Na.

Moreover, with the negative expansion material according to an embodiment of the present invention, an XRD peak intensity $I_{NTE}$ and a background intensity $I_{BG}$ of a primary phase of an orthorhombic crystal structure which exhibits negative expansion characteristics satisfy a relation of $I_{NTE}/I_{BG}>15$. Here, the XRD peak intensity $I_{NTE}$ (NTE: Negative Thermal Expansion) and the background intensity $I_{BG}$ (BG: Back Ground) of the primary phase of the orthorhombic crystal structure which exhibits negative expansion characteristics are defined as follows.

$I_{NTE}$: XRD peak intensity in a range of $26.0°\leq2\theta\leq28.0°$
$I_{BG}$: XRD mean intensity in a range of $10.0°\leq2\theta\leq12.0°$ In the foregoing composition, $0<x\leq0.5$, $x+y+z=1$, $0.3<z<1.0$. With regard to x as the content ratio of Na and Ca, when x is 0; that is, when only using Ba and Sr as conventionally, the specific gravity will increase. Meanwhile, when x exceeds 0.5, it will not be possible to maintain a crystal phase (orthorhombic crystal) having negative thermal expansion characteristics. Moreover, with regard to z as the content ratio of Ba, when z is less than 0.3 or exceeds 0.9, it is not possible to maintain a crystal phase (orthorhombic crystal) having negative thermal expansion characteristics.

Moreover, the negative thermal expansion material according to an embodiment of the present invention preferably has a coefficient of thermal expansion of −5 ppm/K or less. While most materials have positive thermal expansion, since a negative thermal expansion material has a unique property of its volume contracting pursuant to a rise in temperature, strain associated with a change in temperature can be suppressed by compositing the two and controlling the coefficient of thermal expansion. Problems caused by such thermal expansion can be adequately avoided if the coefficient of thermal expansion is −5 ppm/K or less.

Moreover, the negative thermal expansion material according to an embodiment of the present invention preferably has a specific gravity that is less than 4.2. While a negative thermal expansion material is composited by being kneaded into resin or the like, here, there is a problem in that the negative thermal expansion material tends to become sedimented in the resin. Nevertheless, by substituting a part of Ba or Sr having a large specific gravity with one or more types of Na and Ca, the specific gravity can be reduced to be less than 4.2, and the foregoing problem of sedimentation can be mitigated.

Moreover, the negative thermal expansion material according to an embodiment of the present invention preferably has a median diameter D50 that is 5 μm or more and 90 μm or less. As described above, while a negative thermal expansion material is composited by being kneaded into resin or the like, when the median diameter D50 is too small, the handling of the powder becomes difficult. Meanwhile, when the median diameter D50 is too large, the powder becomes aggregated in the resin and it becomes difficult to uniformly disperse the powder. Accordingly, the median diameter D50 is preferably 5 μm or more and 90 μm or less. The term "median diameter D50" means the particle size at an integrated value of 50% regarding the particle size distribution obtained with a laser diffraction scattering particle size measuring device. For example, the median diameter D50 can be measured with the laser diffraction/scattering particle size distribution analyzer LA-960 manufactured by HORIBA, Ltd.

The method of producing the negative thermal expansion material according to an embodiment of the present invention is now explained.

Foremost, a $BaCO_3$ powder, a $SrCO_3$ powder, a $CaCO_3$ powder, a $Na_2CO_3$ powder, a $ZnO_2$ powder, and a $SiO_2$ powder may be used as the raw material powders. Preferably, the mean particle size of these raw material powders is 0.3 μm or more and 10 μm or less. Moreover, since the characteristics may become deteriorated when numerous impurities are contained in the raw material powders, it is preferable to use raw material powders having a purity of 3N or higher.

Next, the raw material powders are weighed to attain a predetermined ratio, and then mixed. As the mixing method, mortar mixing may be used, and the mixing time may be set to be approximately 15 minutes. Next, the mixed powder is filled in a die, and reacted at 1050 to 1250° C. based on the reactive sintering method. When the calcination temperature is less than 1050° C., the reaction will be insufficient, and there are cases where the intended crystal phase (orthorhombic crystal) cannot be obtained. Moreover, when the calcination temperature is 1250° C. or higher, a part of the oxides will evaporate, and there is a possibility that a compositional deviation will occur.

A furnace cooling is conducted after sintering to obtain a $M_xSr_yBa_zZn_2Si_2O_7$ sintered body, and by pulverizing the obtained $M_xSr_yBa_zZn_2Si_2O_7$ sintered body with a mortar or the like, a $M_xSr_yBa_zZn_2Si_2O_7$ powder having an intended particle size can be produced. Note that, by using an X-ray diffraction analysis method (XRD) to measure the peak intensity ratio of a primary phase of an orthorhombic crystal structure which exhibits negative thermal expansion characteristics, and using thermomechanical analysis method (TMA) to measure the coefficient of thermal expansion, it is possible to confirm whether the powder has negative thermal expansion characteristics.

In an embodiment of the present invention, the measurement method and other conditions, including the Examples and Comparative Examples, may be as follows.

(XRD Analysis)
Device: Ultima IV manufactured by Rigaku Corporation
X-ray source: Cu-Kα rays
Tube voltage: 40 kV
Current: 30 mA
Measurement method: 2θ-θ diffraction method
Scan speed: 4.0°/min
Sampling interval: 0.02°
Measurement range: 10° to 90°

(Measurement (TMA Measurement) of Coefficient of Thermal Expansion)
Device:
Rate of temperature rise: 5° C./min
Measured temperature range: 50° C. to 500° C.
Atmosphere: Ar
Standard sample: $Al_2O_3$ The coefficient of thermal expansion of a molded body of powder was measured based on the foregoing conditions. The coefficient of thermal expansion was the mean value of 100° C. to 130° C.

(Measurement of Specific Gravity of Powder)
A dry-type automatic densimeter (AccuPyc II 1340 manufactured by SHIMADZU CORPORATION) was used to measure the specific gravity of dry type powder based on He gas replacement. The measurement was performed 10 times, and the mean value thereof was used as the specific gravity of the powder.

EXAMPLES

The present invention is now explained based on the Examples and Comparative Examples. The Examples are merely illustrative examples, and the present invention is not limited to such Examples. In other words, the present invention includes other modes or modified examples included herein.

Examples 1-20

As the raw material powders, a $BaCO_3$ powder, a $SrCO_3$ powder, a $CaCO_3$ powder, a $Na_2CO_3$ powder, a ZnO powder, and a $SiO_2$ powder were prepared, and the powders were weight to attain the compositions indicated in Table 1. Next, these powders were mixed with a mortar for 15 minutes. Subsequently, the obtained mixed powder was calcined in an air atmosphere at 1050 to 1200° C. for 10 hours. After calcination, the mixed powder was cooled in a furnace, subsequently pulverized with a mortar, and the median diameter D50 was adjusted to be roughly 10 μm. As a result of analyzing the thus obtained powders using XRD, it was confirmed that all of the powders are of a crystal phase (orthorhombic crystal) having negative thermal expansion characteristics. Next, as a result of measuring the TMA of the thus obtained $M_xSr_yBa_zZn_2Si_2O_7$ powders, and it was confirmed that all of the $M_xSr_yBa_zZn_2Si_2O_7$ powders have a coefficient of thermal expansion of −5 ppm/K or less, and have a coefficient of negative thermal expansion. Moreover, in all cases the specific gravity was less than 4.2.

lyzing the thus obtained powder using XRD, the $I_{NTE}/I_{BG}$ was less than 15 and the powder was not a crystal phase (orthorhombic crystal) having negative expansion characteristics.

With the negative thermal expansion material of the present invention, in which its volume contracts pursuant to a rise in temperature, the coefficient of thermal expansion of the composite material can be controlled by being composited with a material having a positive thermal expansion which is common among most materials. The present invention is useful for precision machinery components, optical components, electronic material packages and sensors which require measures to avoid the generation of strain associated with a change in temperature caused by the external environment.

The invention claimed is:

1. A negative thermal expansion material, being formed from $M_xSr_yBa_zZn_2Si_2O_7$ (wherein M is Na, Ca, or a mixture

TABLE 1

$M_xSr_yBa_zZnSi_2O_7$ powder

| | x | | y | z | XRD ∘ means that negative thermal expansion phase is primary phase | $I_{NTE}/I_{BG}$ | TMA ppm/K | Specific gravity (powder density) |
|---|---|---|---|---|---|---|---|---|
| | Na | Ca | Sr | Ba | | | | |
| Example 1 | 0.2 | 0 | 0.5 | 0.3 | ∘ | 26 | −5.5 | 4.02 |
| Example 2 | 0.3 | 0 | 0.4 | 0.3 | ∘ | 26 | −5.8 | 3.97 |
| Example 3 | 0.4 | 0 | 0.3 | 0.3 | ∘ | 37 | −7.1 | 3.93 |
| Example 4 | 0.1 | 0 | 0.5 | 0.4 | ∘ | 37 | −6.0 | 4.11 |
| Example 5 | 0.2 | 0 | 0.4 | 0.4 | ∘ | 26 | −6.0 | 4.06 |
| Example 6 | 0.3 | 0 | 0.3 | 0.4 | ∘ | 30 | −6.5 | 4.00 |
| Example 7 | 0.4 | 0 | 0.2 | 0.4 | ∘ | 25 | −7.0 | 3.96 |
| Example 8 | 0.5 | 0 | 0.1 | 0.4 | ∘ | 26 | −6.2 | 3.87 |
| Example 9 | 0.2 | 0 | 0.3 | 0.5 | ∘ | 30 | −.5.9 | 3.84 |
| Example 10 | 0.3 | 0 | 0.2 | 0.5 | ∘ | 25 | −6.0 | 3.87 |
| Example 11 | 0.2 | 0 | 0.2 | 0.6 | ∘ | 26 | −6.1 | 3.80 |
| Example 12 | 0 | 0.2 | 0.5 | 0.3 | ∘ | 26 | −6.5 | 4.06 |
| Example 13 | 0 | 0.3 | 0.4 | 0.3 | ∘ | 26 | −6.4 | 4.03 |
| Example 14 | 0 | 0.1 | 0.5 | 0.4 | ∘ | 37 | −5.5 | 4.10 |
| Example 15 | 0 | 0.2 | 0.4 | 0.4 | ∘ | 37 | −5 | 4.08 |
| Example 16 | 0 | 0.3 | 0.3 | 0.4 | ∘ | 26 | −5.2 | 4.10 |
| Example 17 | 0 | 0.1 | 0.4 | 0.5 | ∘ | 30 | −6.0 | 4.15 |
| Example 18 | 0 | 0.2 | 0.3 | 0.5 | ∘ | 25 | −6.2 | 4.13 |
| Example 19 | 0 | 0.1 | 0.3 | 0.6 | ∘ | 20 | −5.8 | 4.12 |
| Example 20 | 0.1 | 0.1 | 0.5 | 0.3 | ∘ | 29 | −5.4 | 4.06 |
| Comparative Example 1 | 0 | 0 | 0.5 | 0.5 | ∘ | 26 | −6.0 | 4.25 |
| Comparative Example 2 | 0.6 | 0 | 0 | 0.4 | x | 1.7 | 1.0 | — |

Comparative Example 1

A negative thermal expansion material of $Ba_xSr_yZnSi_2O_7$ to which Ca and Na have not been added was prepared. The negative thermal expansion material was prepared under the same conditions as the foregoing Examples other than not adding the $CaCO_3$ powder and the $Na_2CO_3$ powder. As a result of measuring the TMA of the thus obtained $Ba_{0.5}Sr_{0.5}ZnSi_2O_7$ powder, the result was −6 ppm/K, but the specific gravity was 4.25, and the specific gravity was greater as per conventional negative thermal expansion materials.

Comparative Example 2

The respective powders were weighed so that the composition ratio of Na deviates from the range of the embodiment of the present invention. Otherwise, the negative thermal expansion material was prepared under the same conditions as the foregoing Examples. As a result of anaof Na and Ca, and x+y+z=1, 0<x≤0.5, 0.3<z<1.0), and an XRD peak intensity $I_{NTE}$ and a background intensity $I_{BG}$ of a primary phase of an orthorhombic crystal structure which exhibits negative expansion characteristics satisfy a relation of $I_{NTE}/I_{BG}>15$.

2. The negative thermal expansion material according to claim 1, wherein the negative thermal expansion material has a coefficient of thermal expansion of −5 ppm/K or less.

3. The negative thermal expansion material according to claim 2, wherein the negative thermal expansion material has a specific gravity of less than 4.2 g/cm³.

4. The negative thermal expansion material according to claim 3, wherein the negative thermal expansion material has a median diameter D50 of 5 μm or more and 90 μm or less.

5. A method of producing the negative thermal expansion material according to claim 4, wherein $BaCO_3$ powder, $SrCO_3$ powder, $CaCO_3$ powder, $Na_2CO_3$ powder, $ZnO_2$ powder, and $SiO_2$ powder are used as raw material powders, weighed, mixed, and the mixed powder is thereafter subject to calcination in an atmosphere at 1050° C. or higher and 1250° C. or less.

6. The negative thermal expansion material according to claim 1, wherein the negative thermal expansion material has a specific gravity of less than 4.2 g/cm$^3$.

7. The negative thermal expansion material according to claim 1, wherein the negative thermal expansion material has a median diameter D50 of 5 μm or more and 90 μm or less.

8. A method of producing the negative thermal expansion material according to claim 1, wherein $BaCO_3$ powder, $SrCO_3$ powder, $CaCO_3$ powder, $Na_2CO_3$ powder, $ZnO_2$ powder, and $SiO_2$ powder are used as raw material powders, weighed, mixed, and the mixed powder is thereafter subject to calcination in an atmosphere at 1050° C. or higher and 1250° C. or less.

9. The negative thermal expansion material according to claim 1, wherein $0.1 \leq y \leq 0.5$.

\* \* \* \* \*